United States Patent [19]

Belart et al.

[11] Patent Number: 4,477,125
[45] Date of Patent: Oct. 16, 1984

[54] HYDRAULIC BRAKE SYSTEM HAVING AN ANTISKID SYSTEM

[75] Inventors: Juan Belart, Walldorf; Dieter Kircher; Ludwig Büdecker, both of Frankfurt am Main; Georg Obersteiner, Ffm-Sossenheim, all of Fed. Rep. of Germany

[73] Assignee: ITT Industries, Inc., New York, N.Y.

[21] Appl. No.: 419,685

[22] Filed: Sep. 17, 1982

Related U.S. Application Data

[63] Continuation of Ser. No. 205,549, Nov. 10, 1980, abandoned.

[30] Foreign Application Priority Data

Dec. 22, 1979 [DE] Fed. Rep. of Germany ....... 2952221

[51] Int. Cl.³ .......................... B60T 8/02; B60T 13/14
[52] U.S. Cl. ..................................... 303/116; 60/582; 303/10; 303/119
[58] Field of Search .............. 303/116, 6 R, 2, 10-12, 303/6 A, 113, 114, 3, 119, 52, 68-69, 61-63; 60/582, 428-430, 413; 188/345, 151 A, 181 A, 181 R; 417/279, 1, 287

[56] References Cited

U.S. PATENT DOCUMENTS

| | | | |
|---|---|---|---|
| 2,945,352 | 7/1960 | Stelzer | 60/582 X |
| 3,521,934 | 7/1970 | Leiber | 303/119 |
| 3,550,966 | 12/1970 | Leiber | 303/119 |
| 3,675,422 | 7/1972 | Drutchas et al. | 60/582 X |
| 3,756,666 | 9/1973 | Leiber | 303/116 X |
| 3,836,206 | 9/1974 | Leiber | 303/10 |
| 3,886,848 | 6/1975 | Budecker et al. | 60/413 X |
| 3,942,844 | 3/1976 | Inada et al. | 303/114 X |
| 4,033,637 | 7/1977 | Leiber | 303/10 X |

FOREIGN PATENT DOCUMENTS

| | | | |
|---|---|---|---|
| 1431991 | 7/1969 | Fed. Rep. of Germany | 303/10 |
| 2436321 | 2/1976 | Fed. Rep. of Germany | |
| 2635184 | 2/1978 | Fed. Rep. of Germany | 303/116 |
| 2065807 | 7/1981 | United Kingdom | 303/116 |
| 0578209 | 10/1977 | U.S.S.R. | 303/10 |

*Primary Examiner*—Douglas C. Butler
*Attorney, Agent, or Firm*—James B. Raden; Marvin M. Chaban

[57] ABSTRACT

Hydraulic brake systems are known which comprise antiskid control valves and a pressure fluid source where pressure fluid is fed via a valve device and an antiskid control valve to a wheel brake cylinder. The pressure fluid source includes two jointly driven pumps. The disadvantage of such a system is the constant presence of a high pump output although this high output is only rarely required. Therefore, according to the present invention, an energy saving is realized by having the suction connection of a first of two jointly driven pumps connected to a pressure fluid reservoir and the suction connection of a second of two jointly driven pumps connected to the pressure fluid outlet of an antiskid control valve.

16 Claims, 2 Drawing Figures

HYDRAULIC BRAKE SYSTEM HAVING AN ANTISKID SYSTEM

CROSS-REFERENCE TO RELATED APPLICATION

This is a continuation of application Ser. No. 205,549, filed Nov. 10, 1980, now abandoned.

BACKGROUND OF THE INVENTION

The present invention relates to a hydraulic brake system having an antiskid control system and a pressure fluid source, the pressure fluid of the source being adapted to be fed via a valve device and an antiskid control valve to a wheel brake cylinder, with the pressure fluid source including two pumps with a joint or common drive.

As it is known, hydraulic twin pumps serve to deliver pressure fluid to two separated circuits, with only one single drive being needed. Especially in the field of automotive vehicles, pumps are preferred that require a minimum mounting space. From German Patent DE-OS No. 2,436,321 the problem of having two pumps deliver pressure fluid to the same circuit and to switch one pump over to a depressurized circulation upon attainment of a predetermined pressure, while the other pump continues to operate, is known. Pumps of the aforementioned type are equipped with a joint drive, however, they require additional switching arrangements which will switch the feed cycle of a pump upon attainment of a predetermined pressure.

There is the difficulty in automotive vehicles with antiskid control systems of the hydraulic brake system having a comparatively high volume demand on pressure fluid during a control phase. If a feed pump is constructed according to a high volume demand and driven by the vehicle's motor, for example, this will result in a very large amount of power being taken from the vehicle motor, which is, however, not at all times required in the hydraulic brake system. Even if one pump in an arrangement having two pumps pumps pressure fluid in an idling manner upon attainment of a specific pressure level, as is discussed in the above-cited German Patent, there is still a comparatively great amount of power being used up unncessarily for the operation of the two pumps.

If the drive is constructed as an electric motor, a considerable reduction in the voltage of the main power supply will become obvious when the motor is switched on.

SUMMARY OF THE INVENTION

Therefore, an object of the present invention is to provide two pumps having a common or joint drive in a space-saving arrangement such that the power input of the entire installation is in a most favorable way adjusted to the volume demand of the hydraulic brake system so that an unnecessary power consumption of the drive will be avoided, and so that the necessity of additional controlling valve devices is eliminated.

A feature of the present invention is the provision of a hydraulic brake system for a motor vehicle comprising an unpressurized pressure fluid reservoir; at least one wheel brake cylinder; an antiskid control valve arrangement coupled to the wheel brake cylinder; and a pressure fluid source coupled to the reservoir and the valve arrangement including two pumps having a common drive means, a first of the two pumps having a suction connection coupled to the reservoir and a second of the two pumps having a suction connection coupled to a pressure fluid outlet of the valve arrangement.

It is ensured by this arrangement that a constant volume of pressure fluid is available to the hydraulic brake system so that a normal braking operation is possible at any time. In this mode of operation, the second pump will work with no load so that its power input is relatively low. Only in case of an antiskid control operation, pressure fluid will be fed to the suction connection of the second pump having an increased power input and thereby delivering the pressure fluid into the volume flow of the first pump. Thus, the increased volume demand of the hydraulic brake system during the antiskid control procedure is completely covered.

The energy gain is particularly evident, if a permanent pump drive is provided, for example, by the motor of the automotive vehicle. The power input of the pump aggregate will consist of the power output of the first pump plus the no-load power of the second pump in normal operation. This amount of power demanded of the vehicle motor can be provided without the driver having to put up with obvious losses in drive power. The power input will be increased in case of need only, that is to say, if pressure fluid is made available to the second pump arrangement for delivery.

In addition, it is suitable in many cases to provide an electric motor as the pump drive, for example, in order to avoid damages to V-belts or the like. The pump aggregate is particularly economical with energy, if the electric motor is put into operation by switching elements dependent on the condition of the brake system in case of need only. This arrangement could be such, that the first pump delivers pressure fluid to a pressure accumulator, with the pressure accumulator being monitored by a pressure switch, which will switch off the electric motor upon attainment of a specific pressure level. Furthermore, a switch-on signal could be transmitted to the electric motor when the outlet antiskid control valves are actuated. The actuation of the electric motor is likewise possible if a travel-responsive switch is assigned to the pressure outlet, this switch being actuated upon discharge of pressure fluid into the line connected to the suction input of the second pump to switch on the electromotive drive.

A particularly favorable construction and an increased saving of energy is accomplished, if the first pump has a lower power output than the second pump, with the feed cycle of the first pump being able to be connected with a pressure fluid reservoir. Therefore, the first pump's power delivery is dimensioned such that the pressure fluid reservoir will not be exhausted too early, even when braking several times.

A particularly advantageous embodiment includes having the suction connector of the second pump connected directly with the outlet valve of the antiskid control system by means of a pressure line. Thus, a slight vacuum is generated in the pressure line up to the antiskid control valve with the second pump idling resulting in a quicker decline of pressure in the associated wheel cylinder when the antiskid control valve is opened.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
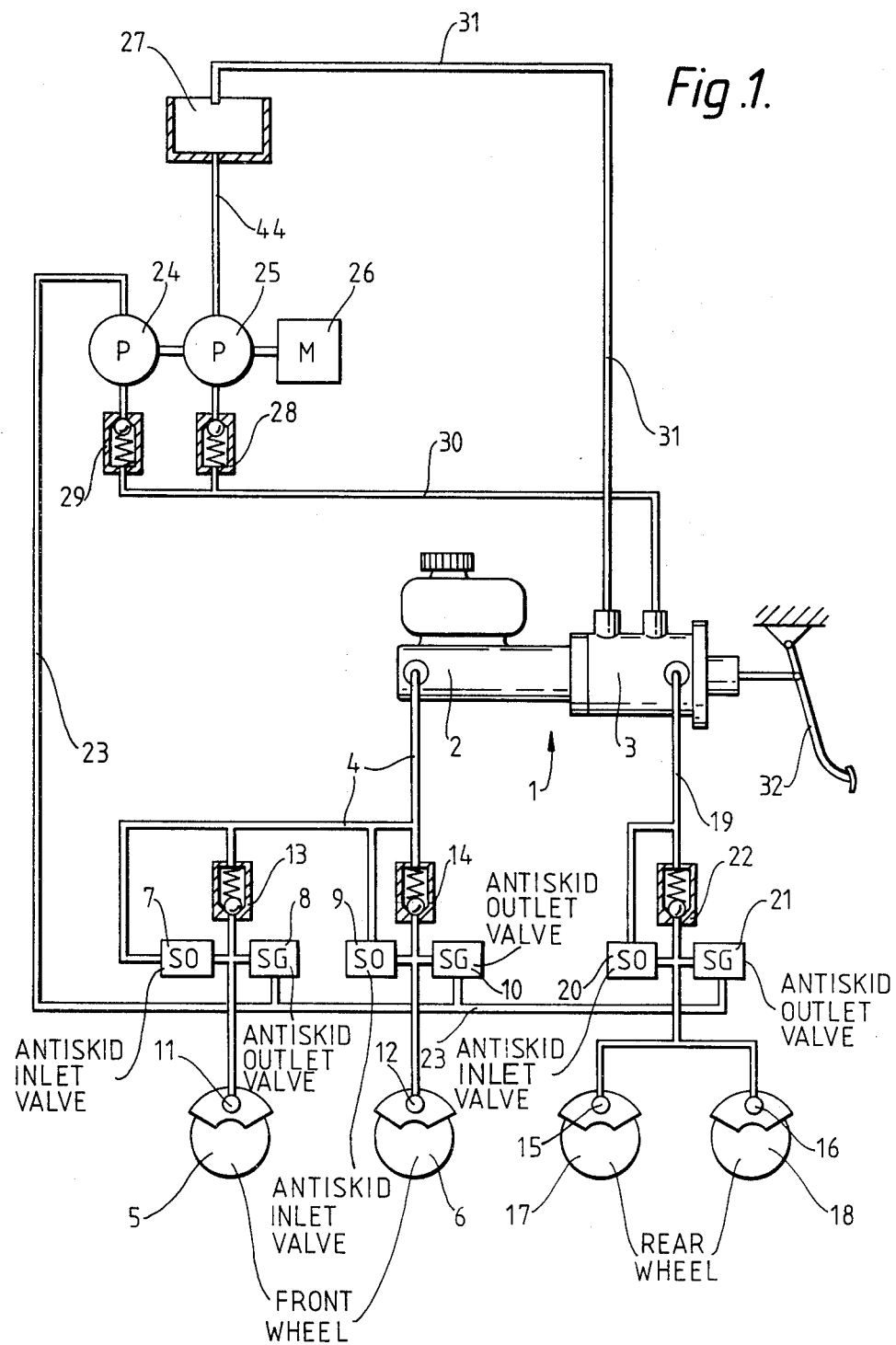
FIG. 1 is a schematic diagram of a hydraulic brake system in accordance with the principles of the present invention having a constant delivery pressure fluid source.

Referring to FIG. 1, reference numeral 1 designates a brake unit having a master brake cylinder 2 and a hydraulic booster 3 connected upstream with respect to master cylinder 2. This brake unit is a brake pedal controlled wheel brake cylinder actuator. Wheel brake cylinders 11 and 12 of the front wheels 5 and 6 are connected to master cylinder 2 via a line system 4 and the deenergized open antiskid inlet solenoid valves 7 and 9. Situated parallel to solenoid valves 7 and 9 are the check valves 13 and 14 allowing a pressure fluid flow from wheel cylinders 11 and 12 to master cylinder 2, if master cylinder 2 is unpressurized.

The wheel cylinders 15 and 16 of the rear wheels 17 and 18 are dynamically controlled directly by the pressurized fluid in hydraulic booster 3 via a line 19 and a deenergized open antiskid inlet solenoid valve 20. A check valve 22 opening to hydraulic booster 3 is connected parallel to solenoid valve 20, check valve 22 permitting a pressure reduction in wheel cylinders 15 and 16 towards booster 3. All wheel cylinders 11, 12, 15 and 16 are connected to a return pipe 23 communicating with the suction connector of pump 24 via antiskid outlet valves 8, 10 and 21 which are normally closed in their deenergized state.

Pump 24 as well as pump 25 are jointly driven by a permanent, mechanical drive 26, such as the vehicle motor. Pump 25 delivers from pressure fluid reservoir 27 through suction connector 44 pressure fluid to hydraulic booster 3 via a check valve 28 and a pressure line 30, while—with hydraulic booster 3 not being actuated—the pressure fluid is reconveyed directly to pressure fluid reservoir 27 via return line 31. This arrangement is a so-called open center system. Pump 24 delivers its pressure fluid via a check valve 29 into pressure line 30, so that the pressure fluid delivered by pump 24 is added to the pressure fluid volume flow delivered by pump 25.

The mode of operation of this system is as follows. Permanent drive 26 drives pumps 24 and 25 simultaneously. Pump 25 delivers the pressure fluid from pressure fluid reservoir 27 directly via line 30 to hydraulic booster 3, in which a pressure will be built up according to the position of brake pedal 32. The superfluous pressure fluid will be returned to pressure fluid reservoir 27 via line 31.

The pressure prevailing in hydraulic booster 3 will be transmitted via line 19 and the open solenoid valve 20 to wheel cylinders 15 and 16 of the rear axle. This pressure will also actuate master cylinder 2 inserted after hydraulic booster 3 so that a pressure will be built up in master cylinder 2 corresponding to the transmission ratio. The latter pressure will be fed to wheel cylinders 11 and 12 of the front axle via line 4 and the open solenoid valves 7 and 9.

No pressure fluid is supplied to pump 24 via line 23 in this normal braking position so that pump 24 runs idle. Consequently, the amount of power input from drive 26 to pumps 24 and 25 is determined by pump 25.

If in case of an imminent locked condition of a wheel, the antiskid control system (not illustrated) intervenes in the brake system via antiskid control valves 7, 8, 9, 10, 20 and 21. With the detection of an imminent locked condition, the antiskid control system closes inlet valves 7, 9 and/or 20 and opens a corresponding one of discharges via the outlet valves 8, 10 and 21 to discharge pressure fluid into line 23. Thus, this pressure fluid will be added directly to the pressure fluid volume flow of pump 25 via pump 24.

Since the volume of pressure fluid taken from the wheel brake cylinders is reconveyed to master brake cylinder 2 or to the assigned wheel brake cylinder via the hydraulic pressure fluid circuit of booster 3, it is not possible for the pressure fluid volume to become exhausted in case of an antiskid controlling operation. Thus, it is always guaranteed that the fluid volume required for a new pressure build-up in the assigned wheel brake cylinder is made available by the pressure fluid circuit of hydraulic booster 3 without allowing undesired fluctuations of pressure to occur in the entire system.

Figure 2:
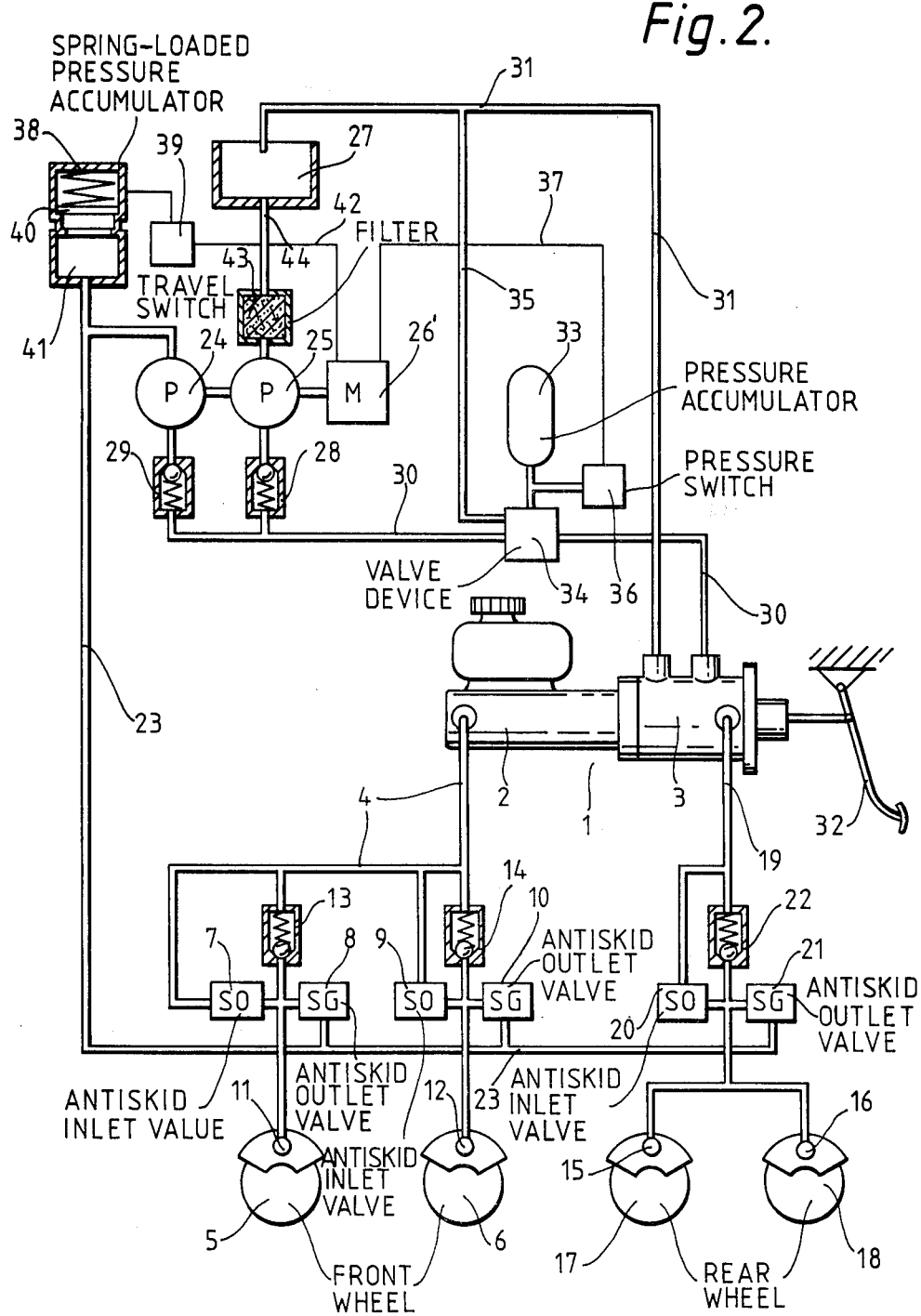
FIG. 2 is a schematic diagram of a hydraulic brake system in accordance with the principles of the present invention having pressure accumulators.

Another embodiment of the hydraulic brake system of the present invention is illustrated in FIG. 2. The reference numerals assigned to elements of FIG. 2 are identical with those employed in FIG. 1 for similar elements, additional elements of FIG. 2 being assigned additional reference numerals. The mode of operation of this system corresponds to a large extent to that of FIG. 1.

To have a more constant pressure for the control of hydraulic booster 3, the open center system of FIG. 1 has been transformed into a pressure-accumulating system of FIG. 2. Pressure accumulator 33 is fed via a valve device 34 by pumps 24 and 25 and check valves 28 and 29. Valve device 34 is the accumulator-charging valve disclosed in U.S. Pat. No. 3,886,848, whose disclosure is incorporated herein by reference. After a pressure has been built up in pressure accumulator 33 corresponding to the working pressure, valve device 34 will deliver all surplus pressure fluid via line 35 and line 31 to pressure fluid reservoir 27. Pumps 24 and 25 again are jointly driven by permanent, machanical drive 26', which, for example, can be accomplished by connecting pumps 24 and 25 to rotating elements of the vehicle motor.

Another operational possibility is to employ an electric motor as drive 26'. The pressure in pressure accumulator 33 is monitored by a pressure switch 36 having an electric control line 37 connected to electric motor 26'. If a predetermined pressure has been reached in pressure accumulator 33, electric motor 26' will be switched off, and electric motor 26' will be put into operation again when the pressure in accumulator 33 decreases below a specific pressure level.

An electrical switching arrangement is provided for the outlet valves of the antiskid control system under control of the antiskid system as mentioned with respect to FIG. 1. If pressure fluid is discharged via valves 8, 10 and/or 21 into line 23, the pressure fluid will first of all be supplied into a spring-loaded pressure accumulator 38, the displaceable bottom 40 of which is displaced so that input chamber 41 will be increased. After wall 40 has traveled a predetermined amount, travel switch 39 will put into operation electromotive drive 26' via a control line 42. This arrangement makes it possible to use an electric motor as drive 26'. However, the electric motor will be put into service only if the hydraulic pressure conditions consider it necessary. If no pressure fluid prevails in line 23, pump 24 will run idle, i.e., the power input of the electric motor is basically determined by pump 25.

The provision of pressure fluid reservoir 27 futhermore affords the possibility of employing a pump for pump 25 having a comparatively low power output since the only purpose of pump 25 is to keep pressure accumulator 33 filled. The system of FIG. 2 may be constructed in a more energy-saving way than the open center system described in FIG. 1, with hydraulic booster 3 being operated by a pressure accumulator or the like.

To be able to ensure the increased power requirements in the event of a controlling procedure by the antiskid control device, pump 24 is equipped with a considerably higher power output than pump 25 so that an increased demand of volume by the hydraulic brake system will be met completely at all times.

To filter any possibly existing dirt particles out of the feed cycle, the suction connector of pump 25 may be provided with a filter 43. A similar filter may be provided for the suction connector of pump device 24.

While we have described above the principles of our invention in connection with specific apparatus, it is to be clearly understood that this description is made only by way of example and not as a limitation to the scope of our invention as set forth in the objects thereof and in the accompanying claims.

We claim:

1. A hydraulic brake system for a motor vehicle comprising:
   an unpressurized pressure fluid reservoir;
   at least one wheel brake cylinder;
   an antiskid control valve arrangement having a normally open inlet valve with its outlet coupled to said wheel brake cylinder and a normally closed outlet valve with its inlet coupled to said wheel brake cylinder, said inlet valve being closed and and said outlet valve being opened during an antiskid control cycle; and
   a pressure fluid source coupled to said reservoir and said valve arrangement including
      a brake pedal controlled wheel brake cylinder actuator having a pressure fluid outlet coupled to an inlet of said inlet valve, and
      two pumps having a common mechanical drive means, a first of said two pumps having a suction connection coupled to said reservoir and a pressure fluid outlet coupled to a pressure fluid inlet of said brake pedal controlled actuator and a second of said two pumps having a suction connection coupled to an outlet of said outlet valve independent of said reservoir and a pressure fluid outlet coupled to said pressure fluid inlet of said brake pedal controlled actuator.

2. A system according to claim 1, wherein said drive means continuously drives said two pumps.

3. A system according to claims 1 or 2, wherein said drive means includes the motor of said motor vehicle.

4. A system according to claims 1, wherein said drive means includes an electric motor.

5. A system according to claim 4, further including switching elements coupled to said electric motor to turn said electric motor on and off in response to pressure conditions in said system.

6. A system according to claim 1, wherein said first pump has a lower power output than said second pump.

7. A system according to claims 1 or 6, wherein said first pump has a pressure output coupled to a first pressure accumulator.

8. A system according to claim 7, wherein said suction connection of said second pump is connected directly to said outlet of said valve arrangement by a pressure line.

9. A system according to claim 8, wherein said pressure line is coupled to a second pressure accumulator.

10. A system according to claim 9, wherein said drive means includes an electric motor responsive to a switch coupled to said first pressure accumulator to turn said motor off when a first pressure value is present in said first pressure accumulator and to turn said motor on when a second pressure value lower than said first pressure value is present in said first pressure accumulator.

11. A system according to claim 9, wherein said drive means includes an electric motor responsive to a switch coupled to said second pressure accumulator to turn said motor off when a first pressure value is present in said second pressure accumulator and to turn said motor on when a second pressure value lower than said first pressure value is present in said second pressure accumulator.

12. A system according to claim 7, wherein said drive means includes an electric motor responsive to a switch coupled to said first pressure accumulator to turn said motor off when a first pressure value is present in said first pressure accumulator and to turn said motor on when a second pressure value lower than said first pressure value is present in said first pressure accumulator.

13. A system according to claims 1 or 6, wherein said suction connection of said second pump is connected directly to said outlet of said outlet valve by a pressure line.

14. A system according to claim 13, wherein said pressure line is coupled to a pressure accumulator.

15. A system according to claim 14, wherein said drive means includes an electric motor responsive to a switch coupled to said pressure accumulator to turn said motor off when a first pressure value is present in said pressure accumulator and to turn said motor on when a second pressure value lower than said first pressure value is present in said pressure accumulator.

16. A system according to claim 1, wherein said second pump adds pressure fluid to pressure fluid delivered by said first pump during an antiskid control cycle.

* * * * *